United States Patent [19]
Saito

[11] Patent Number: 5,444,573
[45] Date of Patent: Aug. 22, 1995

[54] MICROSCOPE OBJECTIVE

[75] Inventor: Yoshiharu Saito, Tokyo, Japan

[73] Assignee: Olympus Optical Co., Ltd., Tokyo, Japan

[21] Appl. No.: 163,692

[22] Filed: Dec. 9, 1993

[30] Foreign Application Priority Data

Dec. 10, 1992 [JP] Japan .................. 4-330372

[51] Int. Cl.⁶ .......................................... G02B 21/02
[52] U.S. Cl. ..................... 359/659; 359/661
[58] Field of Search ................. 359/659, 661

[56] References Cited

U.S. PATENT DOCUMENTS

| | | | |
|---|---|---|---|
| 2,206,155 | 7/1940 | Boegehold | 359/659 |
| 3,912,378 | 10/1975 | Goto | 359/659 |
| 4,379,623 | 4/1983 | Rybicki | 359/659 |
| 4,417,787 | 11/1983 | Danner | 359/659 |

FOREIGN PATENT DOCUMENTS

| | | | |
|---|---|---|---|
| 51-87056 | 7/1976 | Japan . | |
| 0275812 | 12/1986 | Japan | 359/661 |
| 61-275812 | 12/1986 | Japan . | |
| 3-58492 | 9/1991 | Japan . | |
| 4-26445 | 5/1992 | Japan . | |
| 4-26448 | 5/1992 | Japan . | |
| 5119264 | 5/1993 | Japan | 359/659 |

Primary Examiner—Scott J. Sugarman
Assistant Examiner—Evelyn A. Lester
Attorney, Agent, or Firm—Cushman, Darby & Cushman

[57] ABSTRACT

An apochromatic microscope objective of high NA wherein variation of aberrations, including chromatic aberration, caused by a change in the cover glass thickness, is minimized with a relatively simple arrangement. The microscope objective has a 1-st lens unit ($G_1$) which includes a positive meniscus lens having a concave surface directed toward the object side to convert a bundle of rays from an object into a convergent bundle of rays, a 2-nd lens unit ($G_2$) having a negative refractive power, and a 3-rd lens unit ($G_3$) having a small refractive power. The 2-nd lens unit ($G_2$) is movable relative to the 1-st and 3-rd lens units ($G_1$ and $G_3$) along the optical axis in accordance with a change in thickness of a transparent plane-parallel plate disposed between the 1-st lens unit ($G_1$) and the object. The microscope objective satisfies conditions concerning the curvature radius of a lens surface in the 1-st lens unit ($G_1$) that is the closest to the object side and the focal lengths of the 2-nd and 3-rd lens units ($G_2$ and $G_3$).

4 Claims, 17 Drawing Sheets

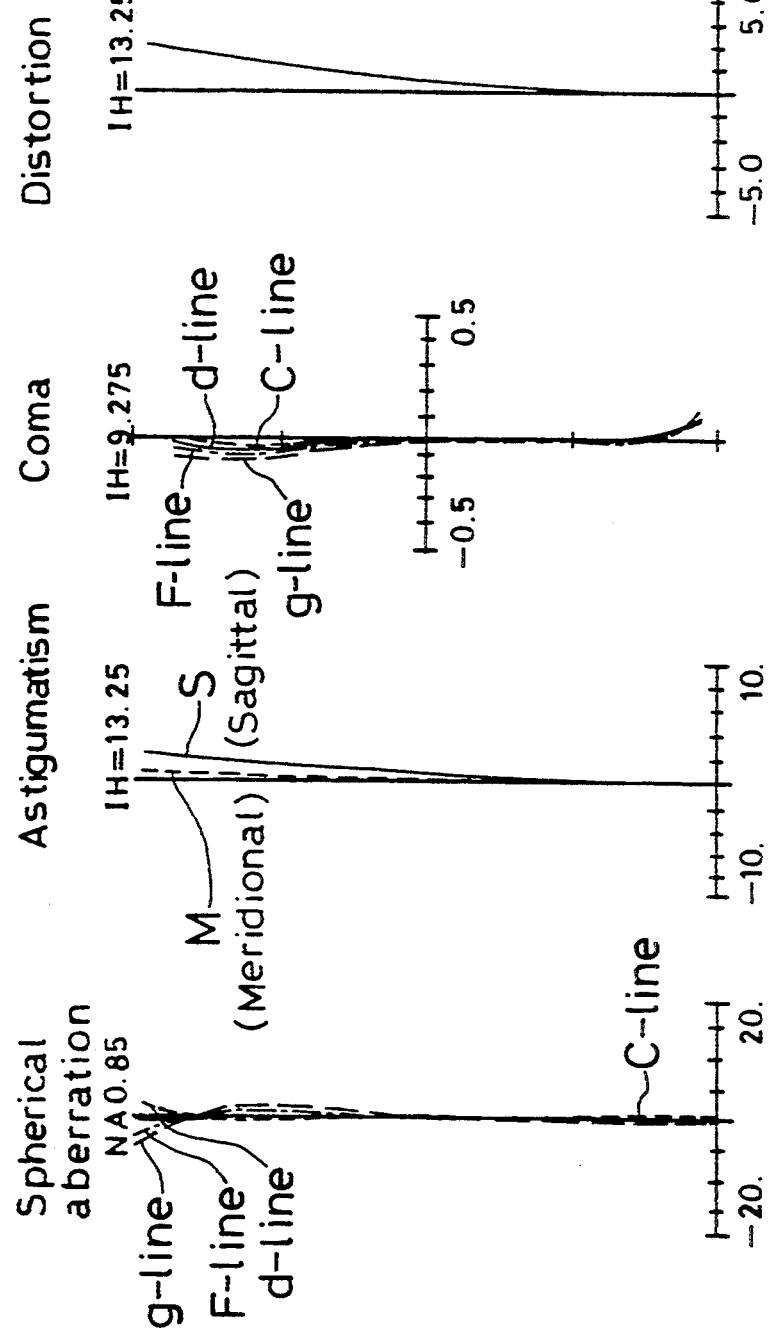

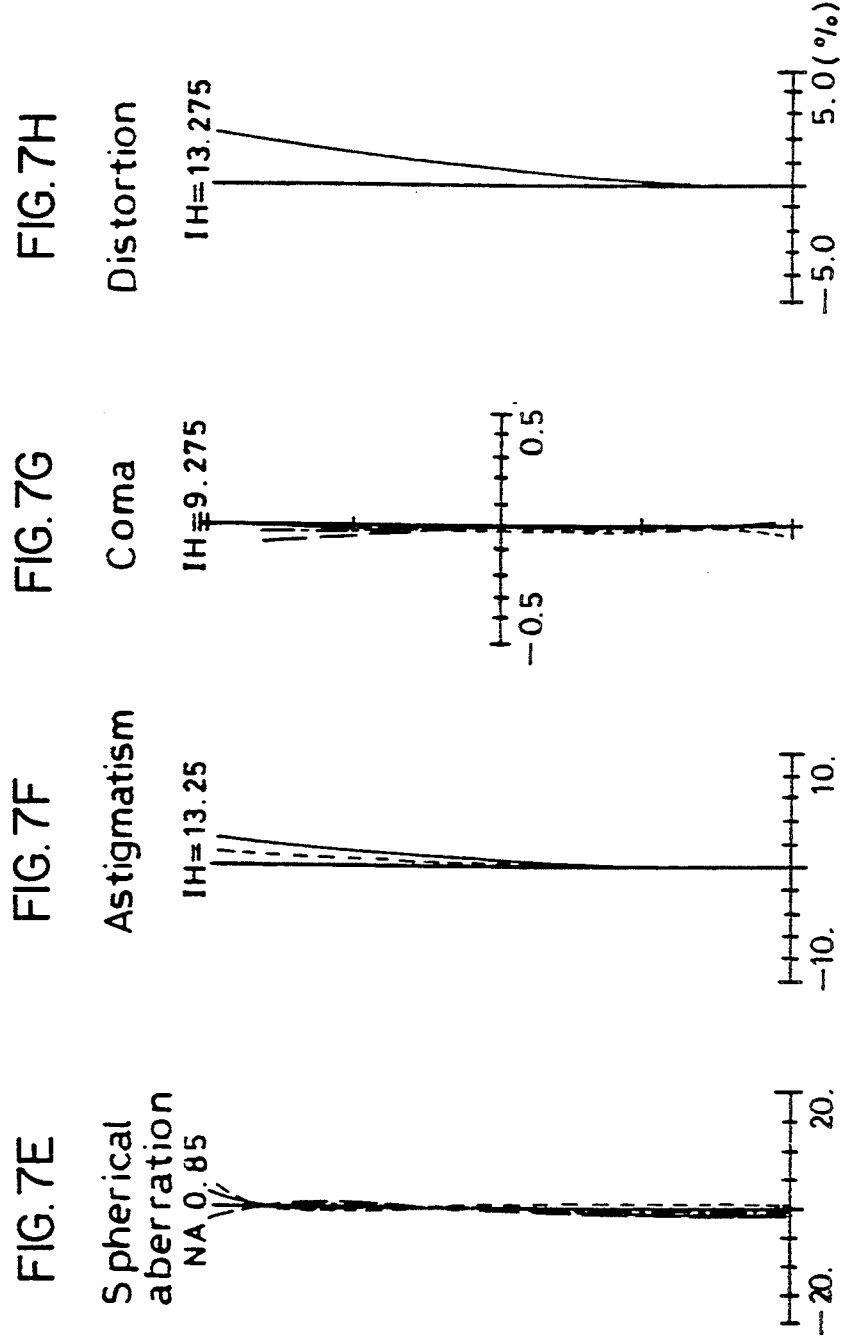

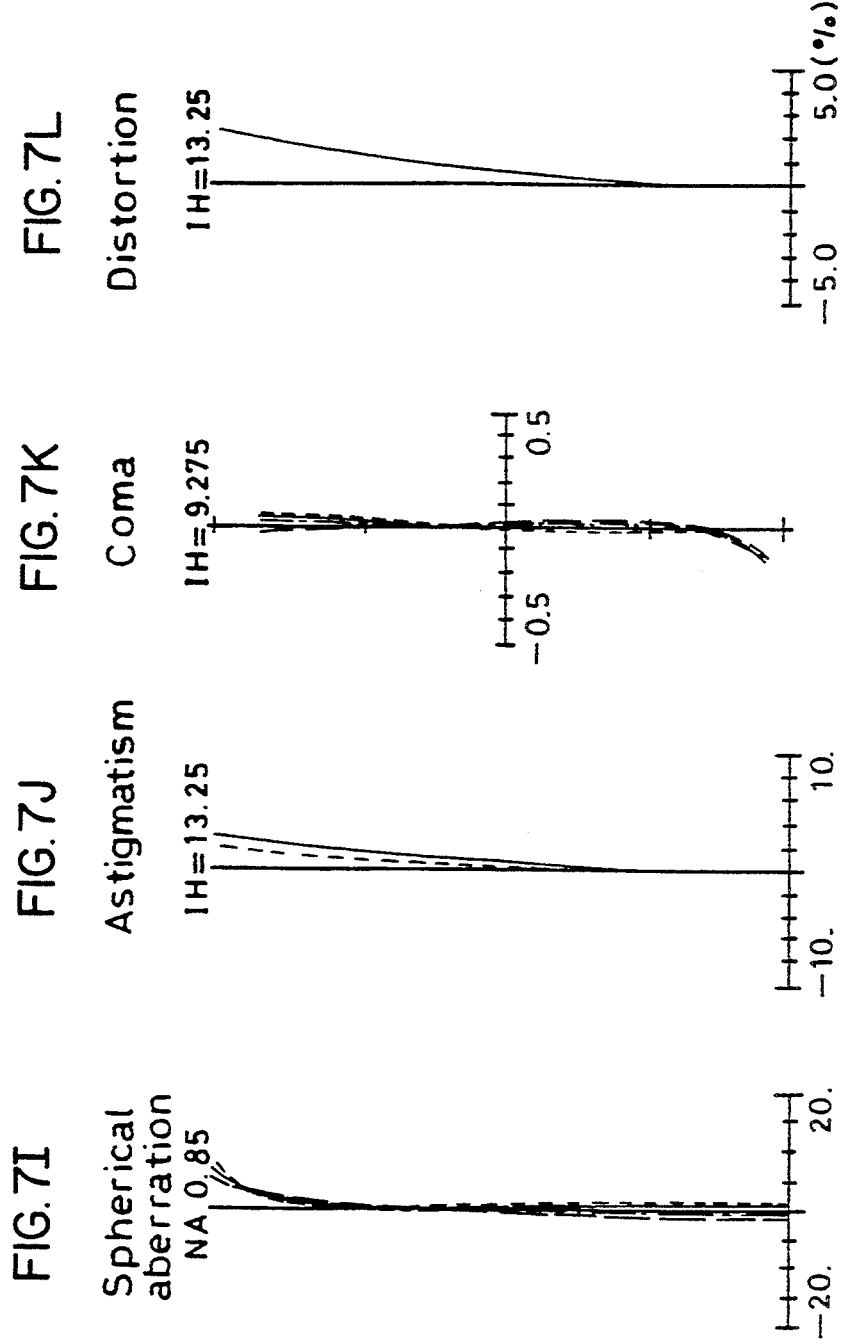

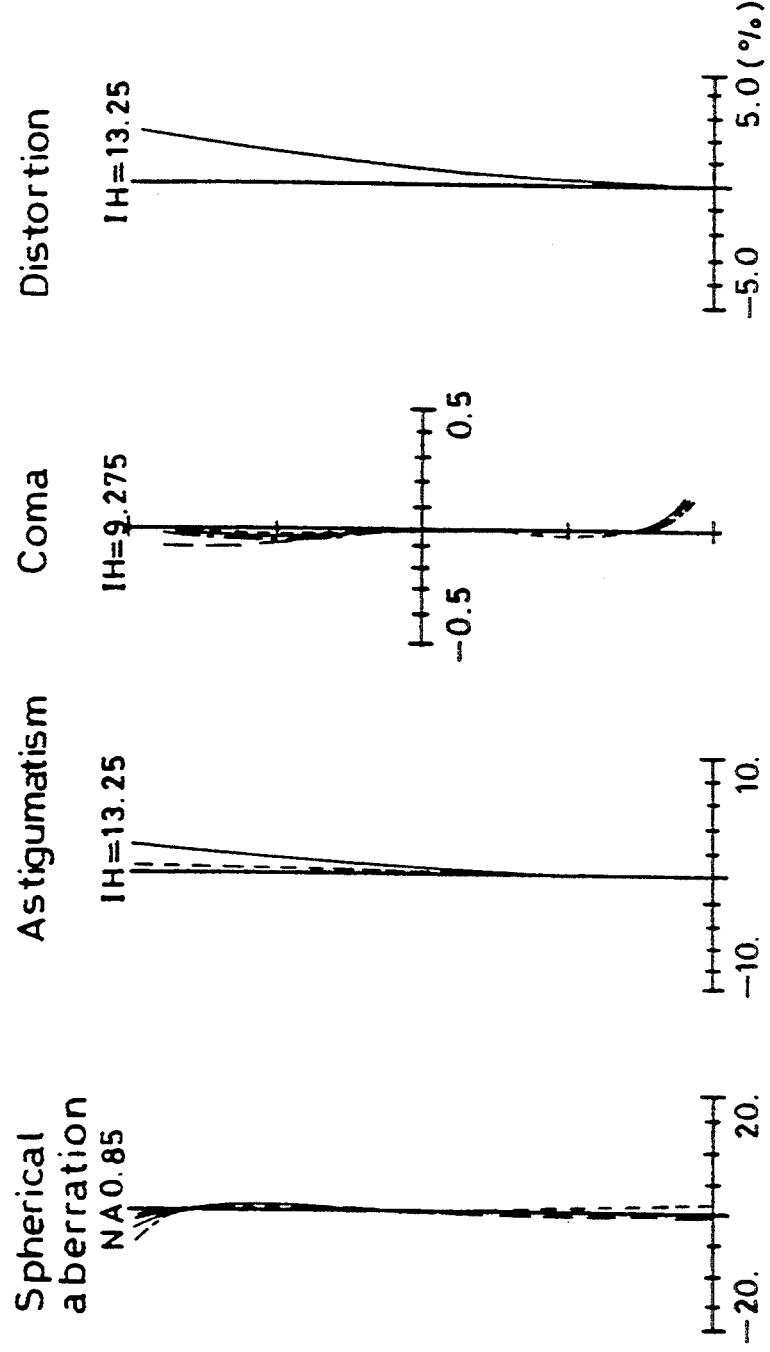

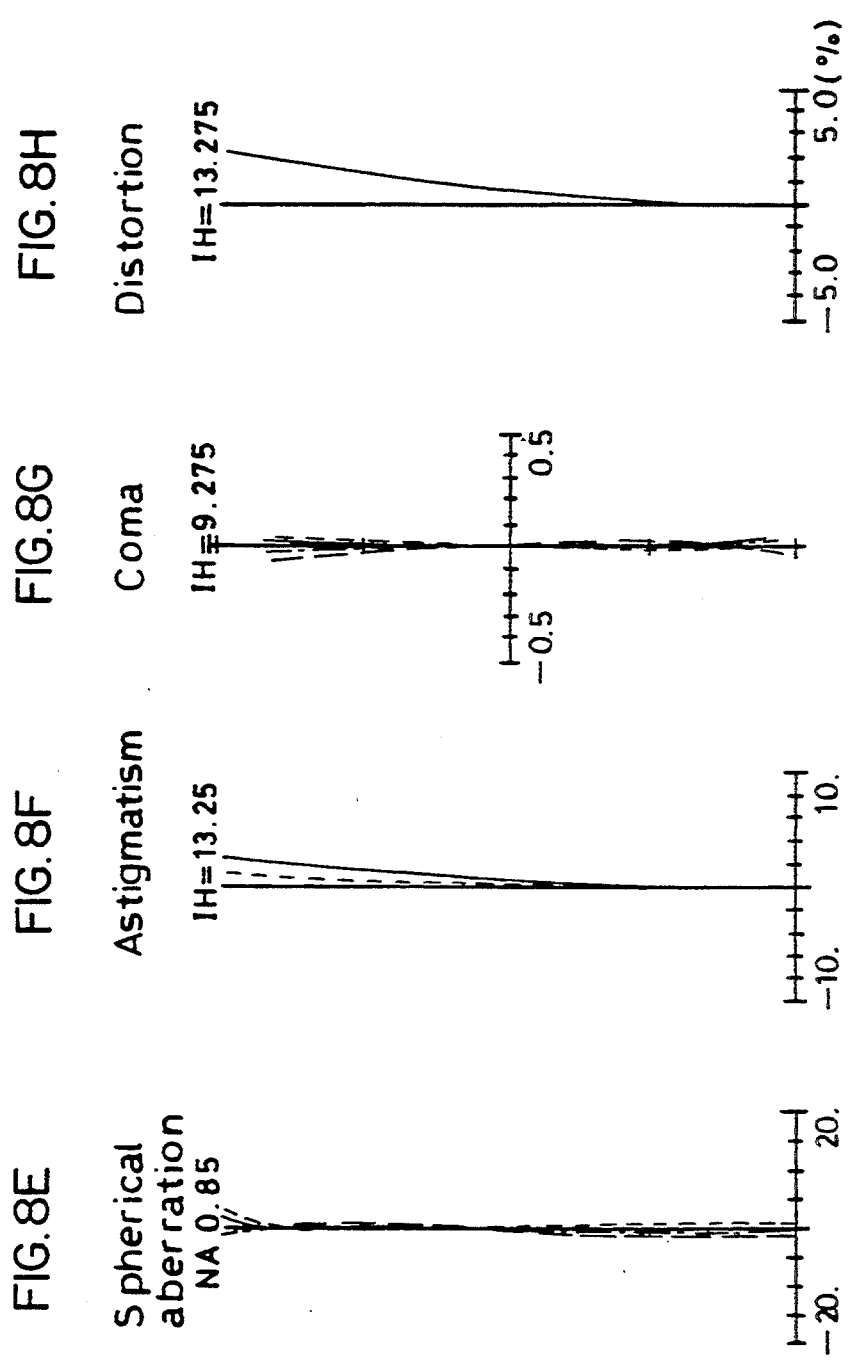

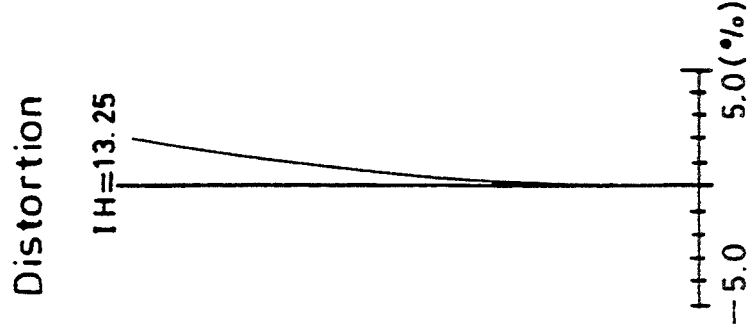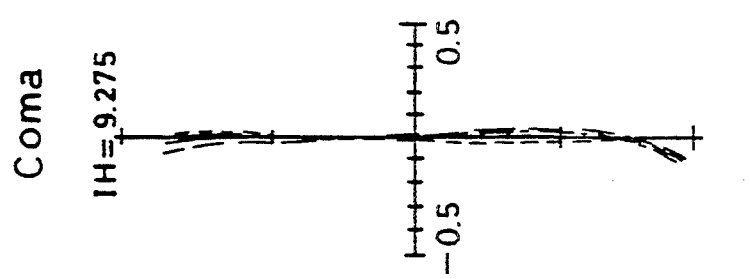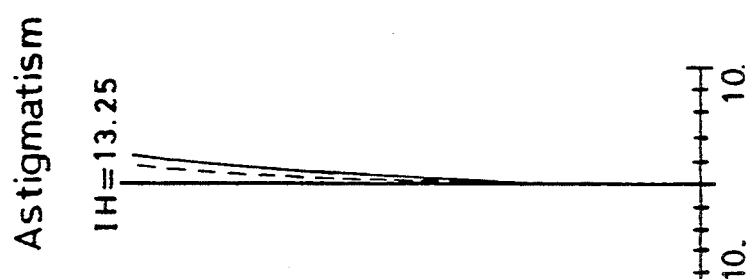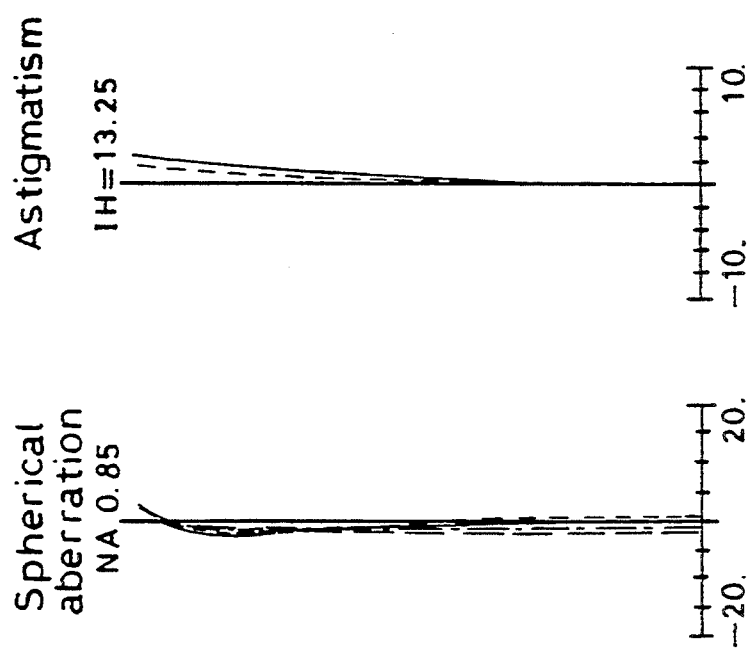

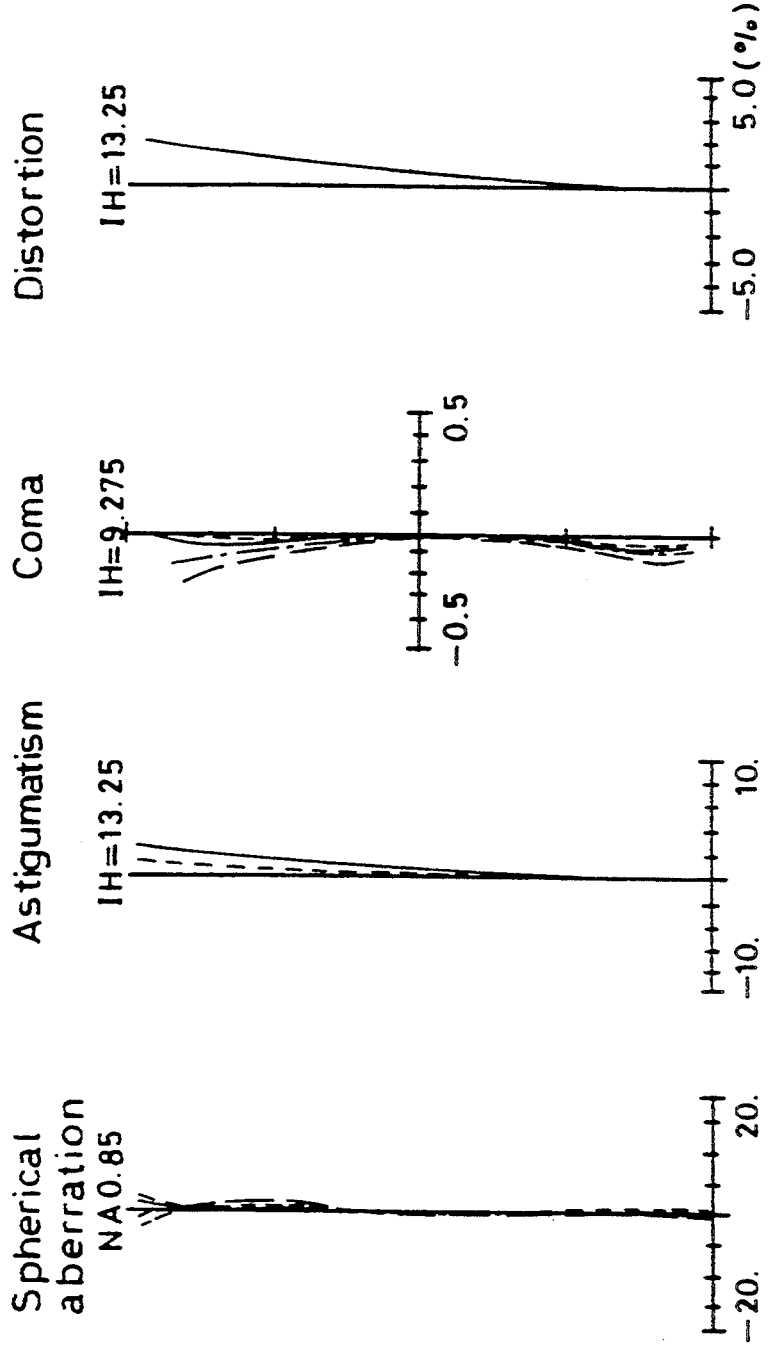

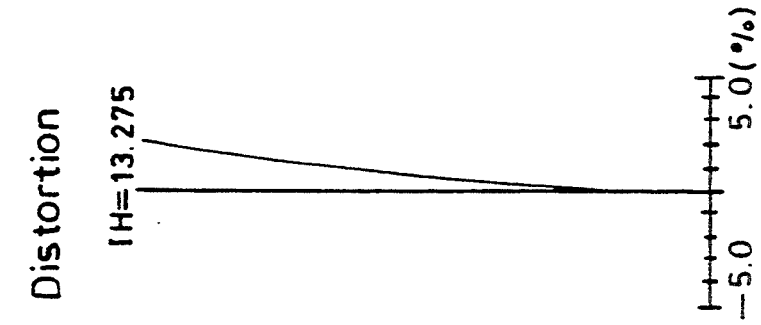
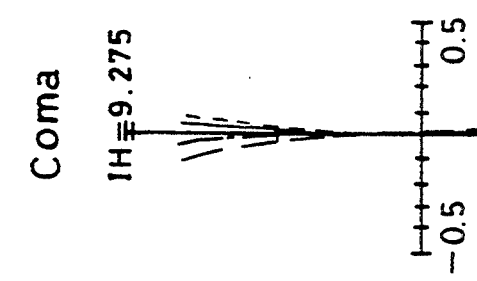

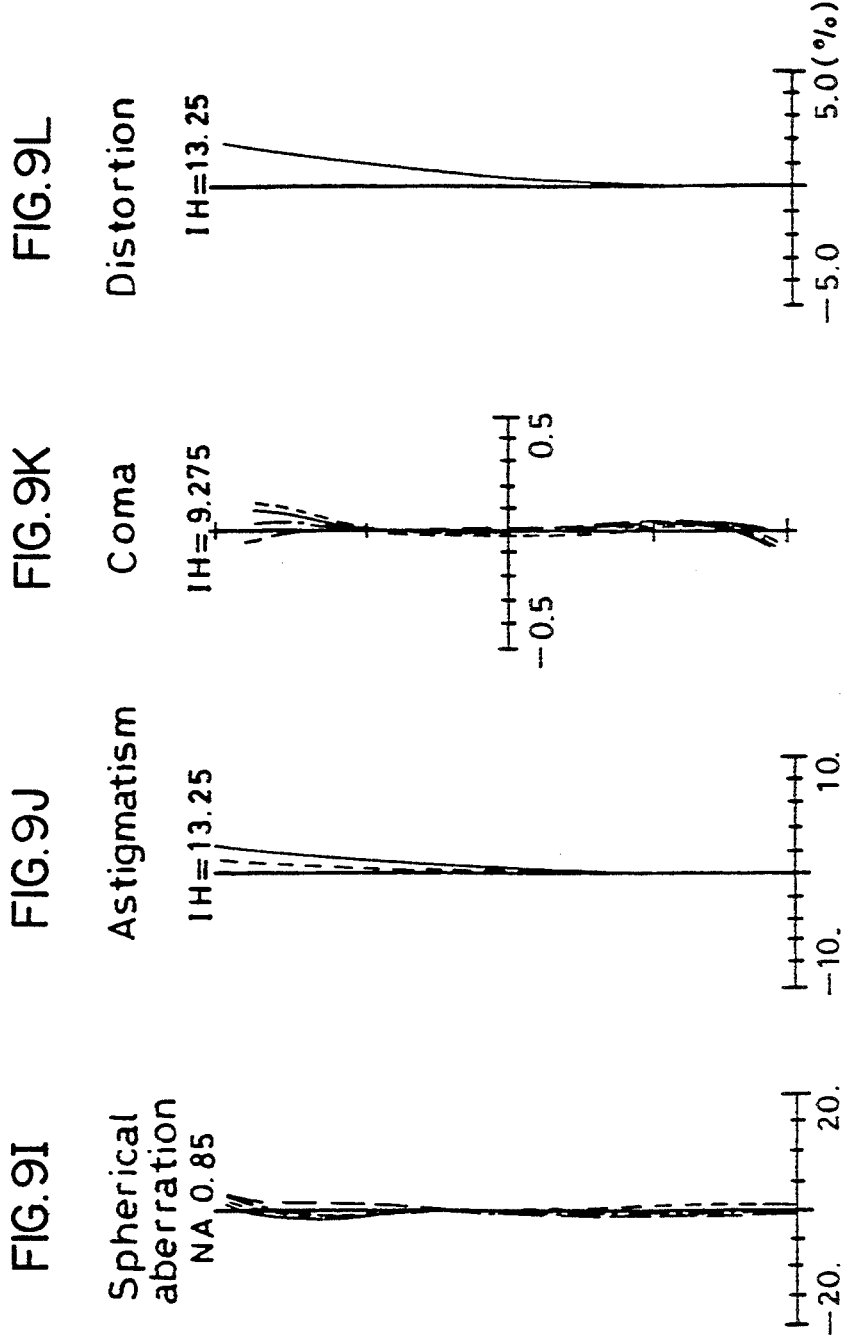

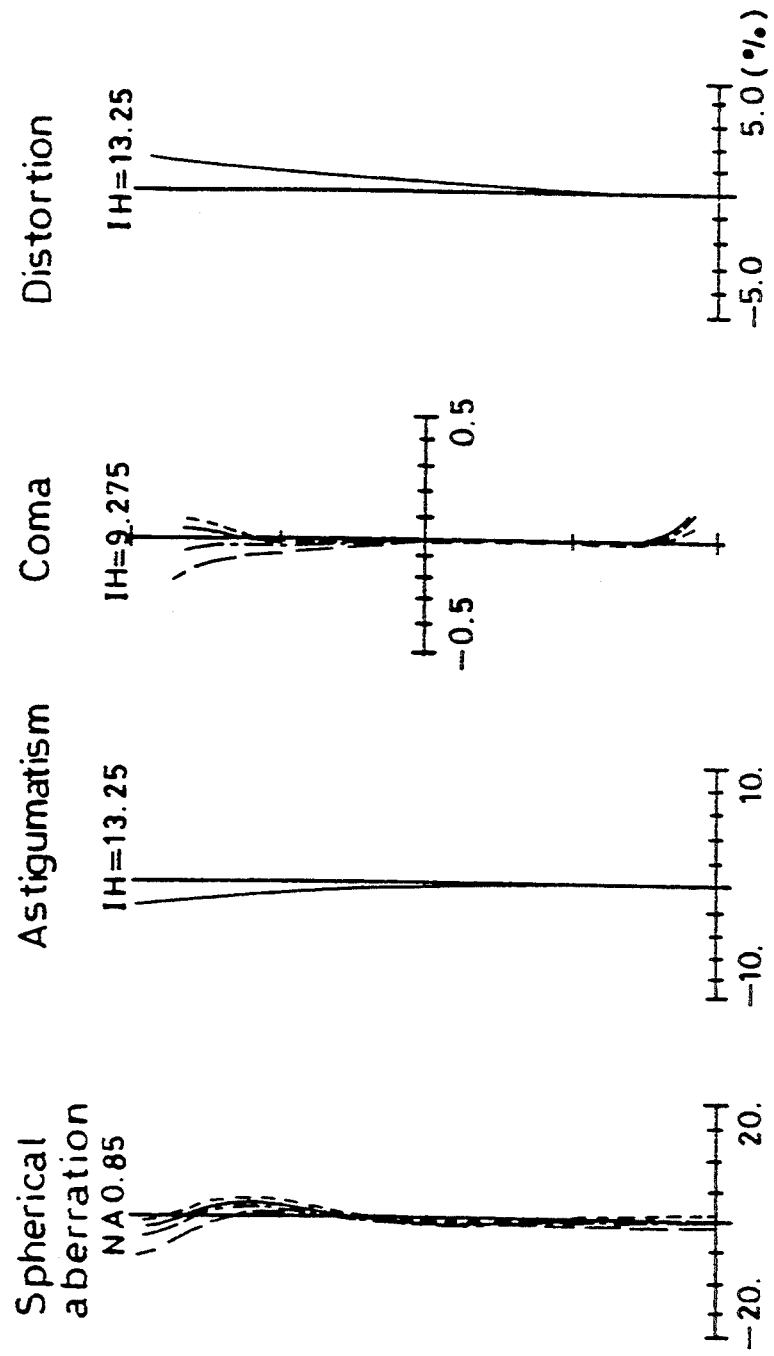

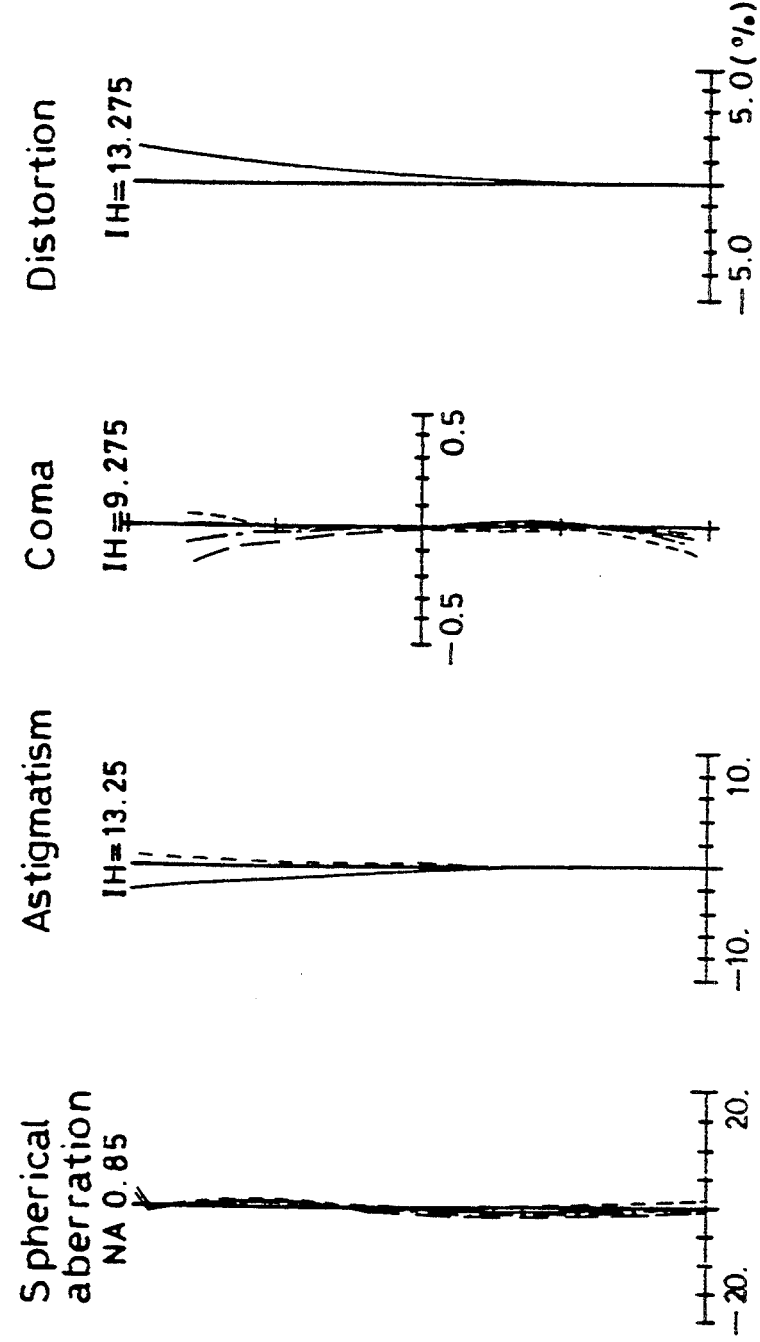

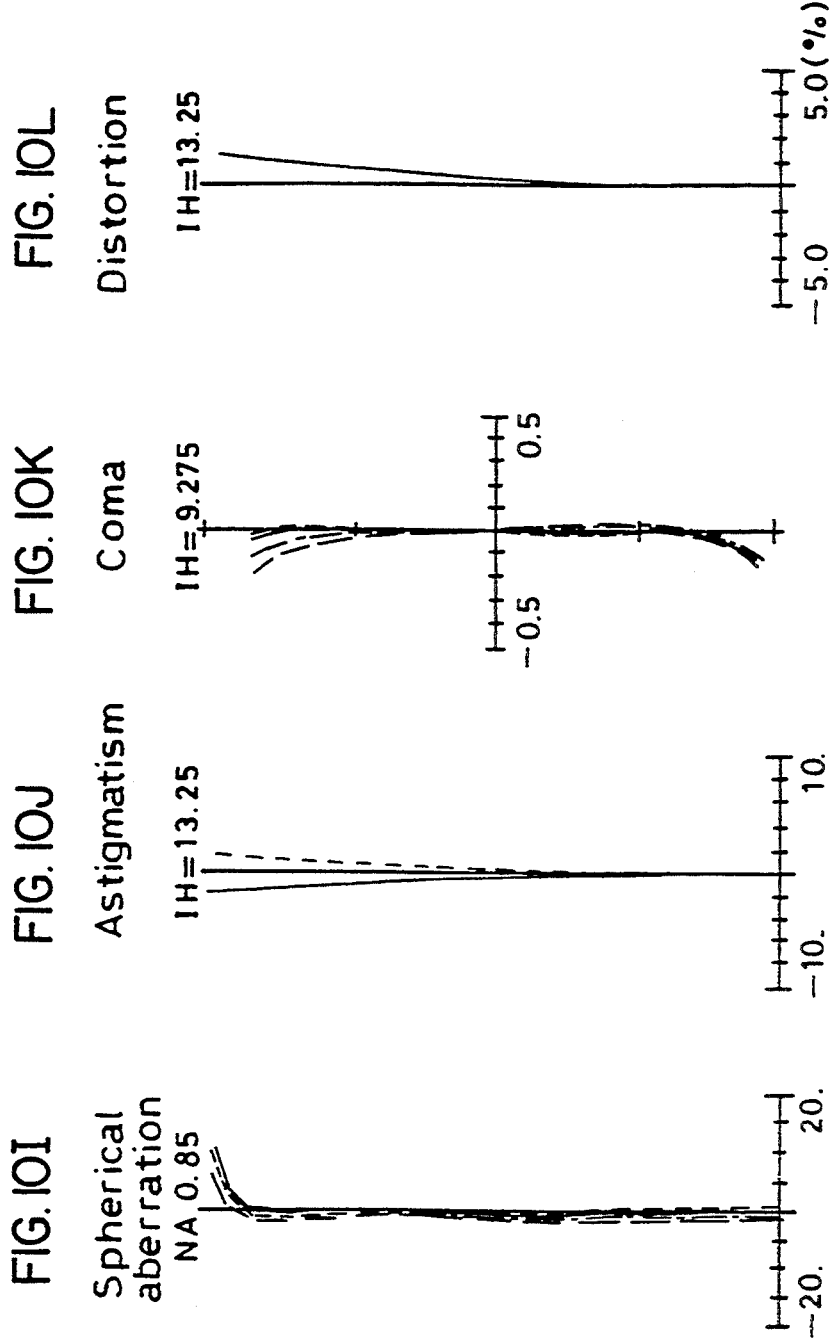

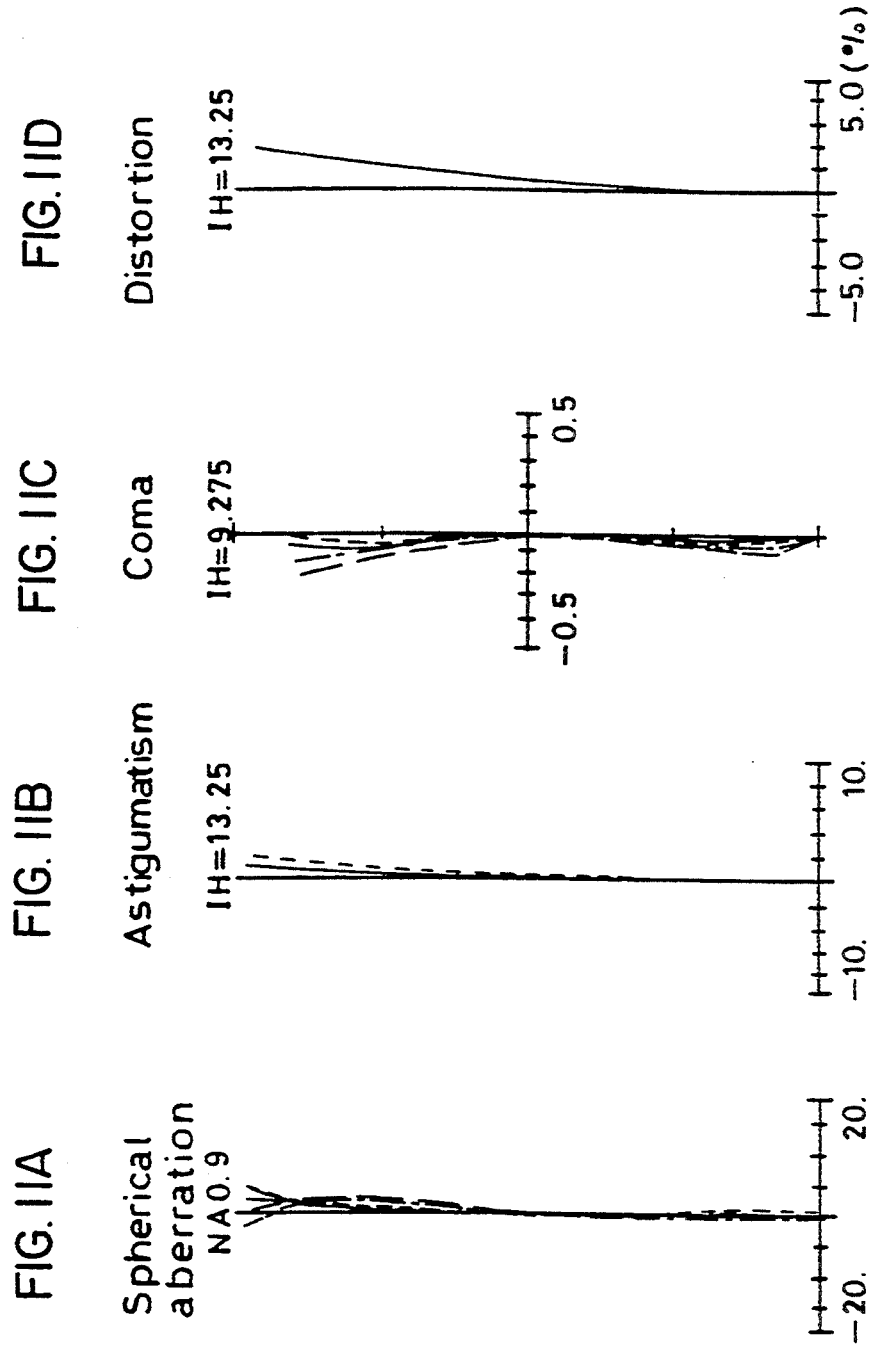

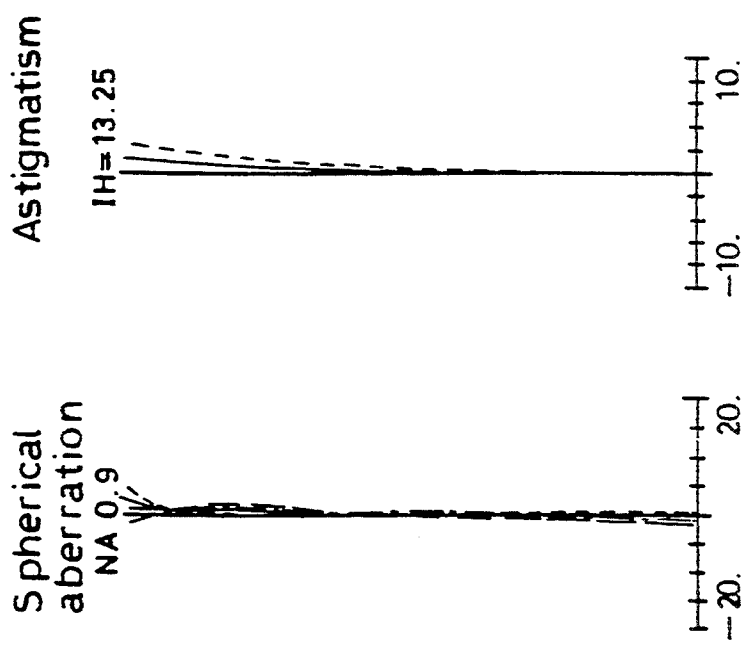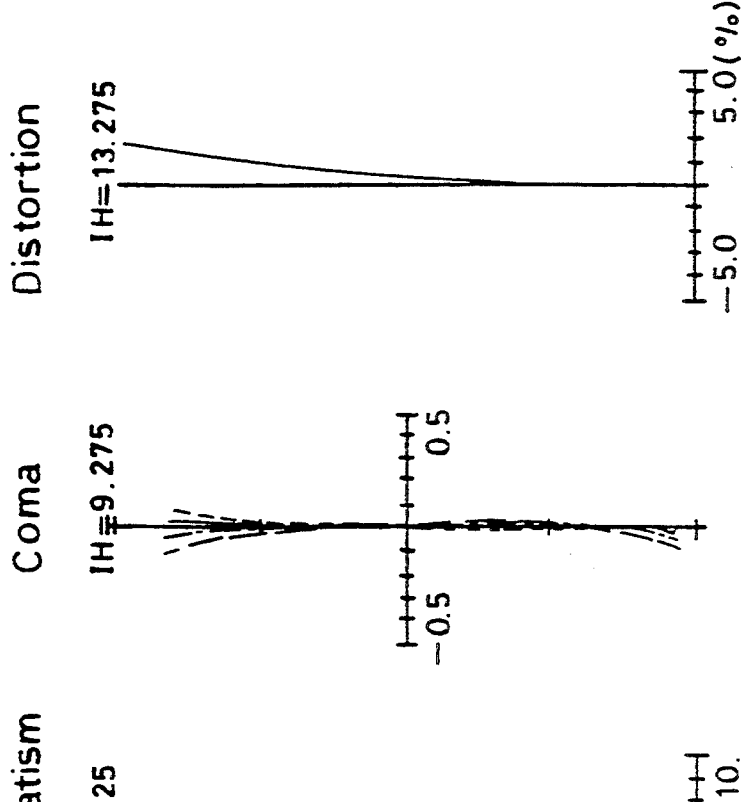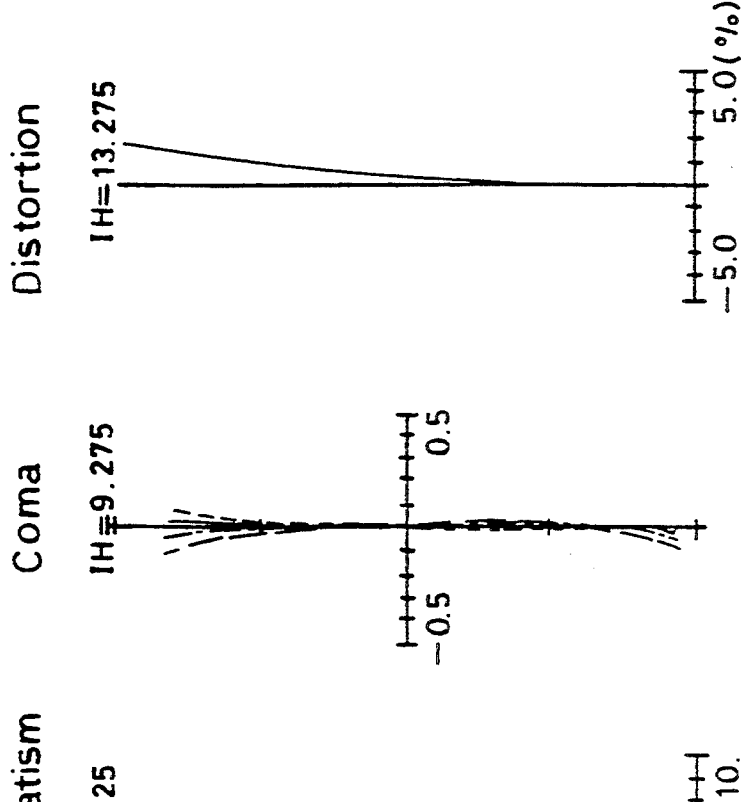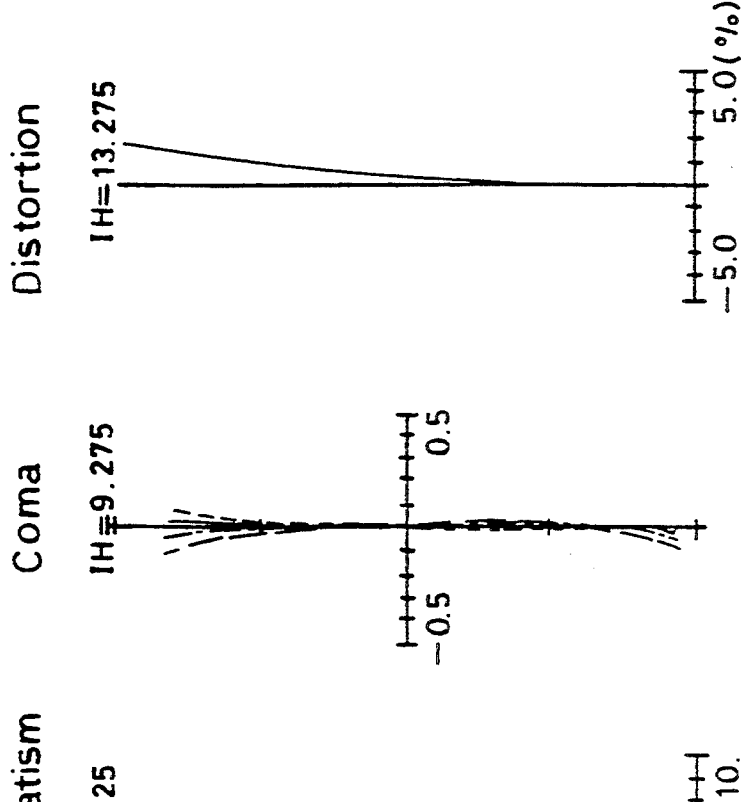

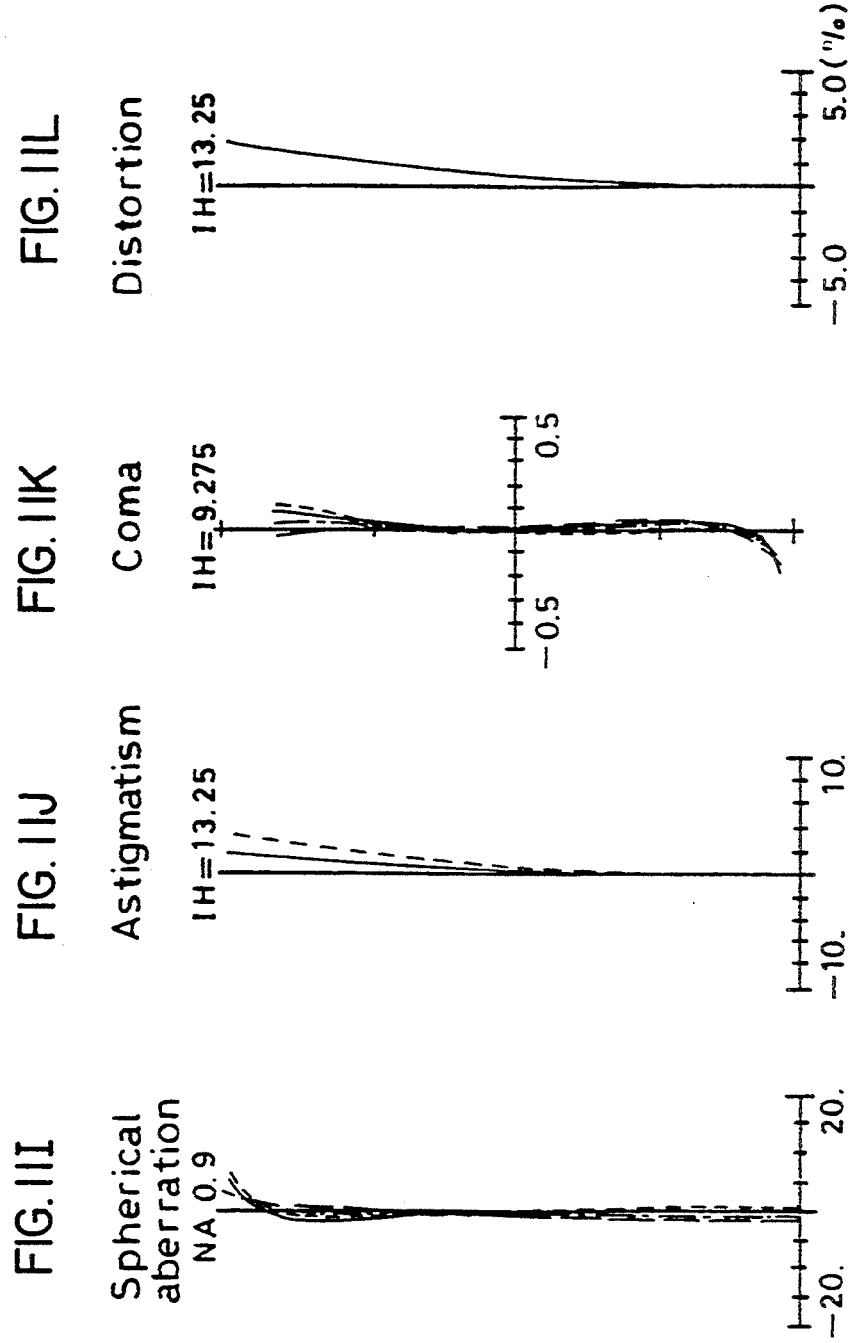

MICROSCOPE OBJECTIVE

BACKGROUND OF THE INVENTION

The present invention relates to a microscope objective and, more particularly, to an apochromatic microscope objective which has a high numerical aperture and yet which can be effectively corrected for various aberrations caused by a change in thickness of a transparent plane-parallel plate, e.g., a cover glass, which is disposed on the object side of the microscope objective.

In general, a microscope objective is designed on the assumption that the cover glass thickness is constant. Therefore, when the cover glass thickness changes, the imaging performance of the microscope objective deteriorates. This phenomenon becomes more remarkable as the numerical aperture (NA) increases. Particularly, when the NA is 0.8 or more, aberrations increase to a considerable extent with only a small change in the cover glass thickness, i.e., about 0.02 mm with respect to the design value. Since variation in thickness of commercially available cover glasses exceeds the above-described value, high-NA objectives other than oil immersion objectives necessitate devising appropriate measures to correct aberrations caused by a change in the cover glass thickness in order to ensure the required performance.

Incidentally, to correct variation of aberrations caused by a change in the cover glass thickness, a method has heretofore been adopted in which a part of a lens system constituting the objective is moved along the optical axis in accordance with a change in the cover glass thickness.

For example, Japanese Patent Application Laid-Open (KOKAI) Nos. 51-87056 (1976) and 61-275812 (1986) disclose an objective including a front lens unit for converting a divergent bundle of rays into a convergent bundle of rays, and a rear lens unit having a negative refractive power, wherein the rear lens unit is moved in accordance with a change in the cover glass thickness, thereby enabling aberration variation to be effectively corrected despite high NA.

Japanese Patent Application Post-Exam Publication Nos. 03-58492 (1991), 04-26445 (1992) and 04-26448 (1992) disclose a microscope objective which includes three lens units, that is, a 1-st lens unit having a positive refractive power, a 2-nd lens unit including a negative lens or having a small refractive power, and a 3-rd lens unit having a negative refractive power, wherein the 2-nd lens unit is moved along the optical axis, thereby correcting aberration variation caused by a change in the cover glass thickness. These conventional techniques correct aberration variation caused by a change in the cover glass thickness in the region of ±1 mm in examples having a NA not higher than 0.7.

In addition, Japanese Patent Application No. 03-281222 (1991) discloses an objective including four lens units, wherein the 2-nd lens unit, which has a small refractive power, is moved along the optical axis, thereby minimizing aberration variation caused by a change in the cover glass thickness, although the objective has a high NA.

As has been described above, Japanese Patent Application Laid-Open (KOKAI) Nos. 51-87056 (1976) and 61-275812 (1986) propose a technique of minimizing aberration variation caused by a change of the cover glass thickness in an objective having a high NA. However, the variation of chromatic aberration cannot satisfactorily be minimized simply by moving the rear lens unit in the lens system composed of two lens units.

Further, Japanese Patent Application No. 03-281222 (1991) proposes a technique of minimizing variation of chromatic aberration in an objective having a high NA. However, the proposed technique suffers from a complicated arrangement and a high cost.

Japanese Patent Application Post-Exam Publication Nos. 03-58492 (1991), 04-26445 (1992) and 04-26448 (1992) are disadvantageous in that the NA is small and chromatic aberration cannot satisfactorily be corrected.

SUMMARY OF THE INVENTION

In view of the above-described circumstances, it is an object of the present invention to provide an apochromatic microscope objective of high NA wherein variation of aberrations, including chromatic aberration, caused by a change in the cover glass thickness, is minimized with a relatively simple arrangement.

To attain the above-described object, the present invention provides a microscope objective having, in order from the object side, a 1-st lens unit $G_1$ of positive refractive power which includes a positive meniscus lens having a concave surface directed toward the object side to convert a bundle of rays from an object into a convergent bundle of rays, a 2-nd lens unit $G_2$ having a negative refractive power, and a 3-rd lens unit $G_3$ having a small refractive power. The 2-nd lens unit $G_2$ is movable relative to the 1-st and 3-rd lens units $G_1$ and $G_3$ along the optical axis in accordance with a change in thickness of a transparent plane-parallel plate disposed between the 1-st lens unit $G_1$ and the object. The microscope objective satisfies the following conditions:

$$0.2 < |r_1/f| < 1.5 \quad (1)$$

$$5 < |f_2/f| < 20 \quad (2)$$

$$40 < |f_3/f| \quad (3)$$

where $r_1$ is the curvature radius of a lens surface in the 1-st lens unit $G_1$ that is the closest to the object side; $f_2$ and $f_3$ are the respective focal lengths of the 2-nd and 3-rd lens units $G_2$ and $G_3$; and f is the focal length of the entire system.

In this case, it is preferable that the 2-nd and 3-rd lens units $G_2$ and $G_3$ should include cemented lenses, respectively, which satisfy the following conditions:

$$\nu_{2P} > 70 \quad (4)$$

$$35 < \nu_{2N} < 50 \quad (5)$$

$$35 < \nu_{3P} < 50 \quad (6)$$

$$\nu_{3N} > 50$$

where $\nu_{2P}$ and $\nu_{2N}$ are the respective Abbe's numbers of positive and negative lenses constituting the cemented lens included in the 2-nd lens unit $G_2$, and $\nu_{3P}$ and $\nu_{3N}$ are the respective Abbe's numbers of positive and negative lenses constituting the cemented lens included in the 3-rd lens unit $G_3$.

The arrangement may be such that the 1-st lens unit $G_1$ includes a positive meniscus lens having a concave surface directed toward the object side, and two positive cemented lenses; the 2-nd lens unit $G_2$ includes a cemented lens composed of three lens elements; and the 3-rd lens unit $G_3$ includes a meniscus lens having a convex surface directed toward the object side.

The arrangement may also be such that the 1-st lens unit $G_1$ includes two positive meniscus lenses each having a concave surface directed toward the object side, and a cemented lens composed of three lens elements; the 2-nd lens unit $G_2$ includes a cemented lens composed of three lens elements; and the 3-rd lens unit $G_3$ includes a meniscus lens having a convex surface directed toward the object side.

The reason for adopting the above-described arrangements and the functions thereof will be explained below.

In the microscope objective of the present invention, the 1-st lens unit $G_1$ has a positive refractive power to convert a bundle of rays from an object into a convergent bundle of rays and to lead it to the 2-nd lens unit $G_2$. In the 1-st lens unit $G_1$, a positive meniscus lens having a concave surface directed toward the object is disposed at a position closest to the object. The concave surface of the positive meniscus lens, which is directed toward the object side, makes the Petzval sum positive to correct the curvature of field and, at the same time, determines the refractive power of the 2-nd lens unit $G_2$ that moves for correcting spherical aberration caused by a change in thickness of a transparent planeparallel plate (e.g., a cover glass) disposed between the 1-st lens unit $G_1$ and the object. As the curvature of the concave surface increases, the positive refractive power of the 1-st lens unit $G_1$ decreases, resulting in a reduction in the negative spherical aberration generated therein. As a result, the negative refractive power of the 2-nd lens unit $G_2$, which generates a positive spherical aberration, also becomes weak. Accordingly, even when the 2-nd lens unit $G_2$ is moved, it is impossible to correct aberration variation caused by a change in the cover glass thickness. Conversely, as the curvature of the concave surface decreases, the positive refractive power of the 1-st lens unit $G_1$ increases, resulting in an increase in the negative spherical aberration generated therein. As a result, the negative refractive power of the 2-nd lens unit $G_2$ increases for correcting the negative spherical aberration generated in the 1-st lens unit $G_1$. Accordingly, when the 2-nd lens unit $G_2$ is moved to correct aberration variation caused by a change in the cover glass thickness, overcorrection occurs. Therefore, it is necessary to satisfy the following condition in order to correct the curvature of field and also correct aberrations caused by a change in the cover glass thickness while maintaining the apochromatic properties at a high NA:

$$0.2 < |r_1/f| < 1.5 \tag{1}$$

where $r_1$ is the curvature radius of a lens surface in the 1-st lens unit $G_1$ which is the closest to the object side, and f is the focal length of the entire system.

If $|r_1/f|$ is not smaller than the upper limit of the condition (1), i.e., 1.5, the negative refractive power of the 1-st lens surface becomes weak, so that the curvature of field cannot be corrected. At the same time, the negative refractive power of the 2-nd lens unit $G_2$ becomes strong as described above. Therefore, when the 2-nd lens unit $G_2$ is moved in order to correct aberration variation caused by a change in the cover glass thickness, overcorrection occurs. If $|r_1/f|$ is not larger than the lower limit of the condition (1), i.e., 0.2, the negative refractive power of the 1-st lens surface becomes strong, so that the curvature of field is overcorrected.

In addition, the negative refractive power of the 2-nd lens unit $G_2$ becomes weak. Therefore, it is impossible to correct aberration variation caused by a change in the cover glass thickness even when the 2-nd lens unit $G_2$ is moved.

The 2-nd lens unit $G_2$ has a negative refractive power for correcting the negative spherical aberration generated in the 1-st lens unit $G_1$. In addition, the 2-nd lens unit $G_2$ moves relative to the 1-st and 3-rd lens units $G_1$ and $G_3$ in accordance with the thickness of the cover glass disposed between the object and the 1-st lens unit $G_1$, thereby correcting aberration variation caused by a change in the cover glass thickness. Since the 2-nd lens unit $G_2$ moves in a convergent bundle of rays, when it relatively moves toward the 1-st lens unit $G_1$, the height of rays entering the 2-nd lens unit $G_2$ increases. Therefore, the positive spherical aberration generated in the 2-nd lens unit $G_2$ increases. Conversely, when the 2-nd lens unit $G_2$ moves away from the 1-st lens unit $G_1$ toward the 3-rd lens unit $G_3$, the height of rays entering the 2-nd lens unit $G_2$ decreases. Therefore, the positive spherical aberration generated in the 2-nd lens unit $G_2$ decreases. On the other hand, as the cover glass thickness decreases, the height of rays emerging from the cover glass decreases, resulting in a reduction in the positive spherical aberration generated in the 2-nd lens unit $G_2$. Consequently, negative spherical aberration is generated in the entire system of the objective. Accordingly, the positive spherical aberration generated in the 2-nd lens unit $G_2$ is increased by relatively moving the 2-nd lens unit $G_2$ toward the 1-st lens unit $G_1$ as described above, thereby canceling the negative spherical aberration generated in the entire system as a result of the reduction in the cover glass thickness. On the other hand, when the cover glass thickness increases, the 2-nd lens unit $G_2$ is relatively moved away from the 1-st lens unit $G_1$, thereby reducing the positive spherical aberration generated in the 2-nd lens unit $G_2$ in order to correct the positive spherical aberration generated as a result of the increase in the height of rays emerging from the cover glass.

In brief, when the cover glass thickness decreases, the 2-nd lens unit $G_2$ is relatively moved toward the 1-st lens unit $G_1$, thereby enabling aberrations to be effectively corrected. When the cover glass thickness increases, the 2-nd lens unit $G_2$ is relatively moved away from the 1-st lens unit $G_1$, thereby enabling effective aberration correction. To correct aberration variation caused by a change in the cover glass thickness by the relative movement of the 2-nd lens unit $G_2$, the following condition must be satisfied:

$$5 < |f_2/f| < 50 \tag{2}$$

where $f_2$ is the focal length of the 2-nd lens unit $G_2$.

If $|f_2/f|$ is not smaller than the upper limit of the condition (2), i.e., 20, the negative refractive power of the 2-nd lens unit $G_2$ becomes weak. Therefore, even when the 2-nd lens unit $G_2$ is moved, aberration correction cannot be made because the variation in aberration caused by the movement of the 2-nd lens unit $G_2$ is small and the variation in aberration caused by a change in the cover glass thickness is large. If $|f_2/f|$ is not larger than the lower limit of the condition (2), i.e., 5, the negative refractive power of the 2-nd lens unit $G_2$ becomes excessively strong. Consequently, the variation in aberration caused by moving the 2-nd lens unit $G_2$ becomes excessively large, causing overcorrection of the aberration variation caused by a change in the cover glass thickness, and leaving an extra curve of spherical aberration. Therefore, it is impossible to correct the aberration variation caused by a change in the cover glass thickness simply by moving the 2-nd lens unit $G_2$.

The 3-rd lens unit $G_3$ keeps balance between spherical and comatic aberrations on the one hand and the curvature of field on the other. For this purpose, it is necessary to satisfy the following condition:

$$40 < |f_3/f| \qquad (2)$$

where $f_3$ is the focal length of the 3-rd lens unit $G_3$.

When the focal length of the 3-rd lens unit $G_3$ is $f_3 > 0$, if $|f_3/f|$ is not larger than the lower limit of the condition (3), i.e., 40, the positive refractive power of the 3-rd lens unit $G_3$ becomes strong, and the Petzval sum increases in the negative direction. Therefore, it becomes impossible to correct the curvature of field. In addition, there is an increase in the variation of various aberrations caused by a change in the height of rays entering the 3-rd lens unit $G_3$ which is caused by the movement of the 2-nd lens unit $G_2$. Accordingly, the aberration variation in the entire system caused by a change in the cover glass thickness cannot be corrected by the movement of the 2-nd lens unit $G_2$. In the case of $f_3 < 0$, if $|f_3/f|$ is not larger than the lower limit of the condition (3), the negative refractive power of the 3-rd lens unit $G_3$ becomes strong, and the Petzval sum increases in the positive direction. Consequently, the curvature of field is overcorrected. In addition, there is an increase in the variation of various aberrations caused by a change in the height of rays entering the 3-rd lens unit $G_3$ which is caused by the movement of the 2-nd lens unit $G_2$, in the same way as in the case of $f_3 > 0$. Accordingly, the aberration variation in the entire system caused by a change in the cover glass thickness cannot be corrected by the movement of the 2-nd lens unit $G_2$.

In designing of an objective for fluorescence observation, it is generally necessary that the transmittance for ultraviolet rays used should be high and that fluorescence from the glass material used should be minimal. For this reason, glass materials which are practically usable are limited, and it is impossible to use glass materials having an Abbe's number of 35 or less and those which have an Abbe's number of 50 or less and a refractive index of 1.62 or higher. Therefore, with a view to effectively making aberration correction for a fluorescence observation objective having the arrangement of the present invention, it is preferable that the 2-nd and 3-rd lens units $G_2$ and $G_3$ should include cemented lenses, respectively, and the following conditions should be satisfied:

$$\nu_{2P} > 70 \qquad (4)$$

$$35 < \nu_{2N} < 50 \qquad 95)$$

$$35 < \nu_{3P} < 50 \qquad (6)$$

$$\nu_{3N} > 50 \qquad (7)$$

where $\nu_{2P}$ and $\nu_{2N}$ are the respective Abbe's numbers of positive and negative lenses constituting the cemented lens included in the 2-nd lens unit $G_2$, and $\nu_{3P}$ and $\nu_{3N}$ are the respective Abbe's numbers of positive and negative lenses constituting the cemented lens included in the 3-rd lens unit $G_3$.

The conditions (4) and (5) are concerned with the Abbe's numbers of the positive and negative lenses constituting the cemented lens included in the 2-nd lens unit $G_2$, which are related to axial chromatic aberration. If the Abbe's number of the positive lens of the cemented lens in the 2-nd lens unit $G_2$ is not larger than the lower limit of the condition (4), i.e., 70, chromatic dispersion caused by the positive lens becomes large, making it difficult to correct axial chromatic aberration in the entire system. In addition, there is an increase in the variation of axial chromatic aberration with the movement of the 2-nd lens unit $G_2$ for making aberration correction for a change in the cover glass thickness. If the Abbe's number of the negative lens of the cemented lens in the 2-nd lens unit $G_2$ is not larger than the lower limit of the condition (5), i.e., 35, there is no glass material available for fluorescence observation. On the other hand, if the Abbe's number of the negative lens is not smaller than the upper limit, i.e., 50, chromatic dispersion caused by the positive lens cannot be corrected by the negative lens.

The conditions (6) and (7) are concerned with the Abbe's numbers of the positive and negative lenses constituting the cemented lens included in the 3-rd lens unit $G_3$, which are related to lateral chromatic aberration. That is, these are conditions for correcting lateral chromatic aberration, which are generated in the 1-st and 2-nd lens units $G_1$ and $G_2$, by the 3-rd lens unit $G_3$. If the Abbe's number of the positive lens of the cemented lens in the 3-rd lens unit $G_3$ is not larger than the lower limit of the condition (6), i.e., 35, there is no glass material available for fluorescence observation, whereas if it is not smaller than the upper limit, i.e., 50, it becomes impossible to correct lateral chromatic aberration generated in the 1-st and 2-nd lens units $G_1$ and $G_2$. Similarly, if the Abbe's number of the negative lens of the cemented lens in the 3-rd lens unit $G_3$ is not larger than the lower limit of the condition (7), i.e., 50, it becomes difficult to correct lateral chromatic aberration generated in the 1-st and 2-nd lens units $G_1$ and $G_2$.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 7a–c graphically shows spherical aberration, astigmatism, coma and distortion in Example 1 when the cover glass thickness is varied.

FIGS. 8a–c graphically shows spherical aberration, astigmatism, coma and distortion in Example 2 when the cover glass thickness is varied in a manner similar to FIG. 7.

FIGS. 9a–c graphically shows spherical aberration, astigmatism, coma and distortion in Example 3 when the cover glass thickness is varied in a manner similar to FIG. 7.

FIGS. 10a–c graphically shows spherical aberration, astigmatism, coma and distortion in Example 4 when the cover glass thickness is varied in a manner similar to FIG. 7.

FIGS. 11a–c graphically shows spherical aberration, astigmatism, coma and distortion in Example 5 when the cover glass thickness is varied in a manner similar to FIG. 7.

DESCRIPTION OF THE PREFERRED EMBODIMENTS

Examples 1 to 5 of the microscope objective according to the present invention will be described below.

Lens data in Examples will be described later. In each Example, the focal length of the objective is $f=4.5$ mm, and the magnification is $\beta=40$. Regarding the numerical aperture, in Examples 1 to 4, $NA=0.85$, and in Example 5, $NA=0.9$. In each Example, lens data was obtained for each of the cover glass thicknesses, i.e., 0.11 mm, 0.17 mm, and 0.23 mm, at the cover glass refractive index $n_d=1.521$ and the Abbe's number $\nu_d=56.02$.

Figure 1:
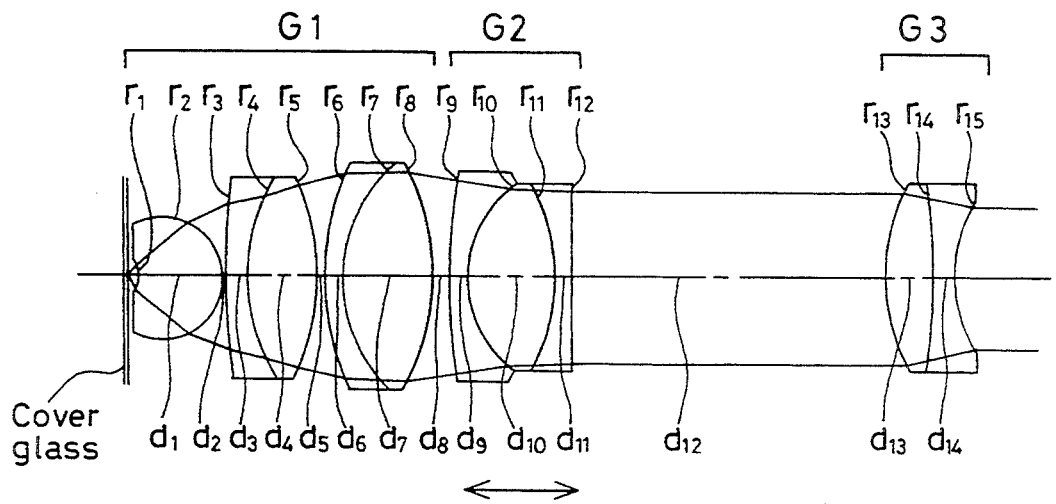
FIG. 1 is a sectional view of Example 1 of the microscope objective according to the present invention.
Figure 2:
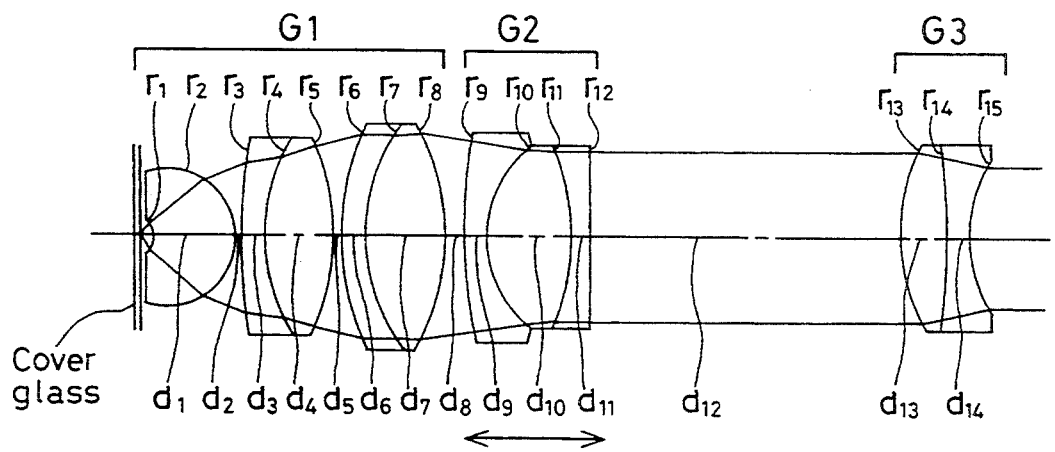
FIG. 2 is a sectional view of Example 2 of the microscope objective according to the present invention.

The lens arrangements of Examples 1 to 5 are shown in the sectional views of FIGS. 1 to 5, respectively. Regarding the lens arrangements of Examples 1 and 2, as shown in FIGS. 1 and 2, the 1-st lens unit $G_1$ includes a positive meniscus lens having a concave surface directed toward the object side, and two cemented lenses each composed of a negative meniscus lens having a concave surface directed toward the image side and a double-convex lens. The 2-nd lens unit $G_2$ includes a cemented lens composed of three lens elements, that is, a negative meniscus lens having a concave surface directed toward the image side, a double-convex lens, and a negative meniscus lens having a concave surface directed toward the object side. The 3-rd lens unit $G_3$ includes a cemented lens composed of a double-convex lens and a double-concave lens.

Figure 3:
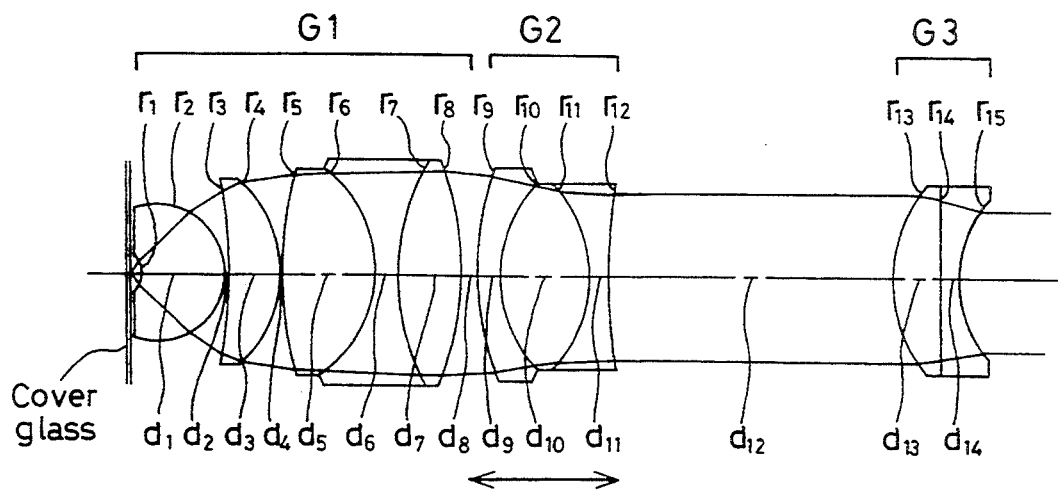
FIG. 3 is a sectional view of Example 3 of the microscope objective according to the present invention.

In Example 3, as shown in FIG. 3, the 1-st lens unit $G_1$ includes a positive meniscus lens having a concave surface directed toward the object side, a positive meniscus lens having a concave surface directed toward the object side, and a cemented lens composed of three lens elements, that is, a double-convex lens, a double-concave lens, and a double-convex lens. The 2-nd lens unit $G_2$ includes a cemented lens composed of three lens elements, that is, a negative meniscus lens having a concave surface directed toward the image side, a double-convex lens, and a double-concave lens. The 3-rd lens unit $G_3$ includes a cemented lens composed of a plano-convex lens having a convex surface directed toward the object side, and a plano-concave lens having a concave surface directed toward the image side.

Figure 4:
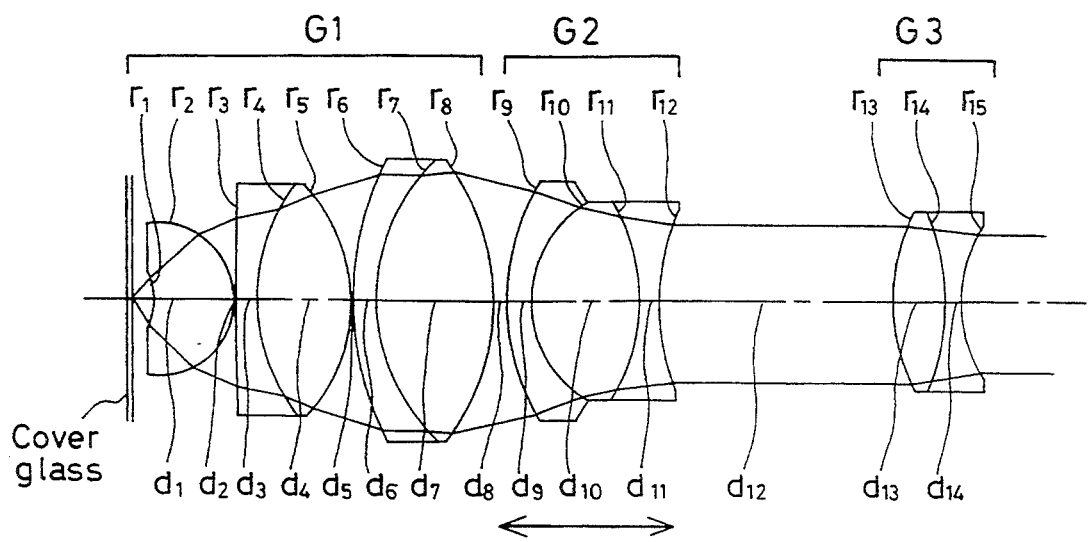
FIG. 4 is a sectional view of Example 4 of the microscope objective according to the present invention.

In Example 4, as shown in FIG. 4, the 1-st lens unit $G_1$ includes a positive meniscus lens having a concave surface directed toward the object side, and two cemented lenses each composed of a negative meniscus lens having a concave surface directed toward the image side and a double-convex lens. The 2-nd lens unit $G_2$ includes a cemented lens composed of three lens elements, that is, a negative meniscus lens having a concave surface directed toward the image side, a double-convex lens, and a double-concave lens. The 3-rd lens unit $G_3$ includes a cemented lens composed of a double-convex lens and a double-concave lens.

Figure 5:
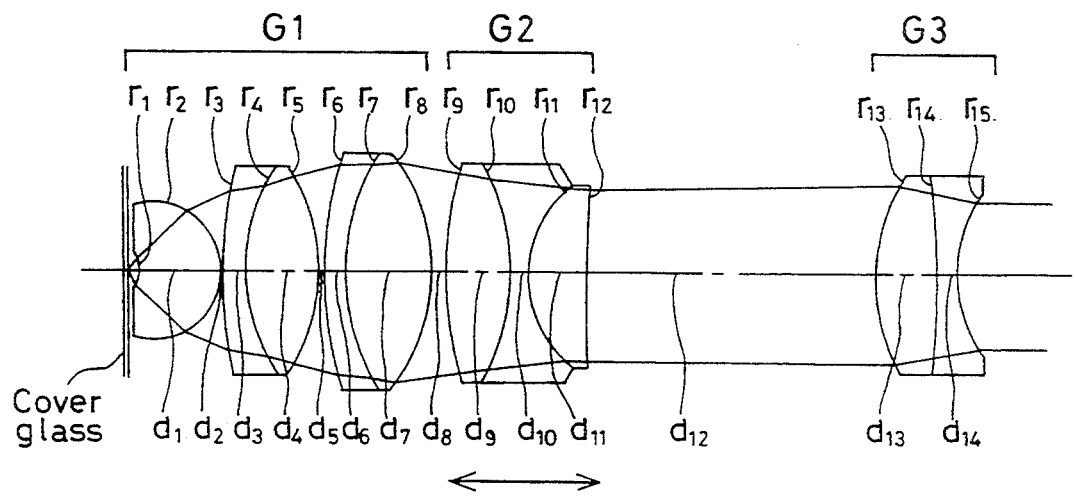
FIG. 5 is a sectional view of Example 5 of the microscope objective according to the present invention.

In Example 5, as shown in FIG. 5, the 1-st lens unit $G_1$ includes a positive meniscus lens having a concave surface directed toward the object side, and two cemented lenses each composed of a negative meniscus lens having a concave surface directed toward the image side, and a double-convex lens. The 2-nd lens unit $G_2$ includes a cemented lens composed of three lens elements, that is, a double-convex lens, a double-concave lens, and a positive meniscus lens having a concave surface directed toward the image side. The 3-rd lens unit $G_3$ includes a cemented lens composed of a double-convex lens and a double-concave lens.

Lens data in Examples 1 to 5 will be shown below. In the following: WD is the working distance; $r_1, r_2 \ldots$ are the curvature radii of lens surfaces, which are shown in order from the object side; $d_1, d_2 \ldots$ are the spacings between adjacent lens surfaces, shown in order from the object side; $n_{d1}, n_{d2} \ldots$ are the refractive indices of the lenses for the spectral d-line, shown in order from the object side; and $\nu_{d1}, \nu_{d2} \ldots$ are the Abbe's numbers of the lenses, shown in order from the object side.

| Example 1 | | | |
|---|---|---|---|
| $r_1 = -2.0080$ | $d_1 = 4.8303$ | $n_{d1} = 1.69680$ | $\nu_{d1} = 56.49$ |
| $r_2 = -3.5087$ | $d_2 = 0.1500$ | | |
| $r_3 = 62.0990$ | $d_3 = 1.1000$ | $n_{d2} = 1.61340$ | $\nu_{d2} = 43.84$ |
| $r_4 = 9.6017$ | $d_4 = 4.0600$ | $n_{d3} = 1.43389$ | $\nu_{d3} = 95.15$ |
| $r_5 = -10.8491$ | $d_5 = 0.3000$ | | |
| $r_6 = 14.6039$ | $d_6 = 1.2000$ | $n_{d4} = 1.49782$ | $\nu_{d4} = 66.83$ |
| $r_7 = 8.5818$ | $d_7 = 4.7800$ | $n_{d5} = 1.43389$ | $\nu_{d5} = 95.15$ |
| $r_8 = -12.3591$ | $d_8 = 0.9500$ | | |
| $r_9 = 36.7613$ | $d_9 = 1.2000$ | $n_{d6} = 1.61340$ | $\nu_{d6} = 43.84$ |
| $r_{10} = 6.3106$ | $d_{10} = 4.6900$ | $n_{d7} = 1.43389$ | $\nu_{d7} = 95.15$ |
| $r_{11} = -11.0633$ | $d_{11} = 1.0000$ | $n_{d8} = 1.61340$ | $\nu_{d8} = 43.84$ |
| $r_{12} = -105.0178$ | $d_{12} = 17.3221$ | | |
| $r_{13} = 9.8259$ | $d_{13} = 2.7935$ | $n_{d9} = 1.58144$ | $\nu_{d9} = 40.75$ |
| $r_{14} = -43.7916$ | $d_{14} = 1.2500$ | $n_{d10} = 1.51821$ | $\nu_{d10} = 65.04$ |
| $r_{15} = 7.1523$ | | | |

| cover glass thickness (mm) | 0.11 | 0.17 | 0.23 |
|---|---|---|---|
| WD | 0.457 | 0.41 | 0.363 |
| $d_8$ | 0.461 | 0.95 | 1.435 |
| $d_{12}$ | 17.811 | 17.322 | 16.838 |

(1) $|r_1/f| = 0.446$

-continued (2) $|f_2/f| = 10.1$
(3) $|f_3/f| = 276$
(4) $\nu_{2P} = 95.15$
(5) $\nu_{2N} = 43.84$
(6) $\nu_{3P} = 40.75$
(7) $\nu_{3N} = 65.04$

Example 2

| | | | |
|---|---|---|---|
| $r_1 = -1.9916$ | $d_1 = 4.8300$ | $n_{d1} = 1.69680$ | $\nu_{d1} = 56.49$ |
| $r_2 = -3.5069$ | $d_2 = 0.1500$ | | |
| $r_3 = 33.6687$ | $d_3 = 1.2300$ | $n_{d2} = 1.69680$ | $\nu_{d2} = 56.49$ |
| $r_4 = 9.3593$ | $d_4 = 4.0600$ | $n_{d3} = 1.43389$ | $\nu_{d3} = 95.15$ |
| $r_5 = -11.4787$ | $d_5 = 0.3000$ | | |
| $r_6 = 14.2443$ | $d_6 = 1.2000$ | $n_{d4} = 1.59551$ | $\nu_{d4} = 39.21$ |
| $r_7 = 9.4694$ | $d_7 = 4.7800$ | $n_{d5} = 1.43389$ | $\nu_{d5} = 95.15$ |
| $r_8 = -11.3227$ | $d_8 = 0.9500$ | | |
| $r_9 = 30.0783$ | $d_9 = 1.3000$ | $n_{d6} = 1.61340$ | $\nu_{d6} = 43.84$ |
| $r_{10} = 6.2194$ | $d_{10} = 4.6900$ | $n_{d7} = 1.43389$ | $\nu_{d7} = 95.15$ |
| $r_{11} = -10.8692$ | $d_{11} = 1.0274$ | $n_{d8} = 1.61340$ | $\nu_{d8} = 43.84$ |
| $r_{12} = -407.0275$ | $d_{12} = 17.0784$ | | |
| $r_{13} = 9.7705$ | $d_{13} = 2.7800$ | $n_{d9} = 1.59551$ | $\nu_{d9} = 39.21$ |
| $r_{14} = -67.9051$ | $d_{14} = 1.2500$ | $n_{d10} = 1.51821$ | $\nu_{d10} = 65.04$ |
| $r_{15} = 7.0790$ | | | |

| cover glass thickness (mm) | 0.11 | 0.17 | 0.23 |
|---|---|---|---|
| WD | 0.457 | 0.41 | 0.363 |
| $d_8$ | 0.452 | 0.95 | 1.498 |
| $d_{12}$ | 17.576 | 17.078 | 16.53 |

(1) $|r_1/f| = 0.443$
(2) $|f_2/f| = 9.61$
(3) $|f_3/f| = 815$
(4) $\nu_{2P} = 95.15$
(5) $\nu_{2N} = 43.84$
(6) $\nu_{3P} = 39.21$
(7) $\nu_{3N} = 65.04$

Example 3

| | | | |
|---|---|---|---|
| $r_1 = -1.8469$ | $d_1 = 4.8656$ | $n_{d1} = 1.51633$ | $\nu_{d1} = 64.15$ |
| $r_2 = -3.6306$ | $d_2 = 0.1100$ | | |
| $r_3 = -30.0755$ | $d_3 = 2.9500$ | $n_{d2} = 1.49700$ | $\nu_{d2} = 81.61$ |
| $r_4 = -6.5062$ | $d_4 = 0.1300$ | | |
| $r_5 = 22.6787$ | $d_5 = 5.3000$ | $n_{d3} = 1.49700$ | $\nu_{d3} = 81.61$ |
| $r_6 = -6.5620$ | $d_6 = 1.1000$ | $n_{d4} = 1.52682$ | $\nu_{d4} = 51.12$ |
| $r_7 = 11.4045$ | $d_7 = 3.5000$ | $n_{d5} = 1.49700$ | $\nu_{d5} = 81.61$ |
| $r_8 = -15.6299$ | $d_8 = 1.0000$ | | |
| $r_9 = 16.2512$ | $d_9 = 1.1500$ | $n_{d6} = 1.61340$ | $\nu_{d6} = 43.84$ |
| $r_{10} = 6.9882$ | $d_{10} = 5.0600$ | $n_{d7} = 1.43389$ | $\nu_{d7} = 95.15$ |
| $r_{11} = -7.2959$ | $d_{11} = 1.0000$ | $n_{d8} = 1.52682$ | $\nu_{d8} = 51.12$ |
| $r_{12} = 30.3289$ | $d_{12} = 15.9842$ | | |
| $r_{13} = 8.6530$ | $d_{13} = 2.5000$ | $n_{d9} = 1.59551$ | $\nu_{d9} = 39.21$ |
| $r_{14} = \infty$ | $d_{14} = 1.2500$ | $n_{d10} = 1.51821$ | $\nu_{d10} = 65.04$ |
| $r_{15} = 6.4252$ | | | |

| cover glass thickness (mm) | 0.11 | 0.17 | 0.23 |
|---|---|---|---|
| WD | 0.454 | 0.41 | 0.366 |
| $d_8$ | 0.17 | 1 | 1.875 |
| $d_{12}$ | 16.814 | 15.984 | 15.109 |

(1) $|r_1/f| = 0.41$
(2) $|f_2/f| = 14.6$
(3) $|f_3/f| = 155$
(4) $\nu_{2P} = 95.15$
(5) $\nu_{2N} = 43.84$
(6) $\nu_{3P} = 39.21$
(7) $\nu_{3N} = 65.04$

Example 4

| | | | |
|---|---|---|---|
| $r_1 = -4.1906$ | $d_1 = 4.7359$ | $n_{d1} = 1.78650$ | $\nu_{d1} = 50.00$ |
| $r_2 = -4.2938$ | $d_2 = 0.1000$ | | |
| $r_3 = 205.8983$ | $d_3 = 1.1000$ | $n_{d2} = 1.78650$ | $\nu_{d2} = 50.00$ |
| $r_4 = 10.5028$ | $d_4 = 5.2000$ | $n_{d3} = 1.43389$ | $\nu_{d3} = 95.15$ |
| $r_5 = -9.1115$ | $d_5 = 0.1500$ | | |
| $r_6 = 16.7161$ | $d_6 = 1.2000$ | $n_{d4} = 1.59551$ | $\nu_{d4} = 39.21$ |
| $r_7 = 10.6654$ | $d_7 = 6.7000$ | $n_{d5} = 1.43389$ | $\nu_{d5} = 95.15$ |
| $r_8 = -11.4780$ | $d_8 = 0.6509$ | | |
| $r_9 = 11.8775$ | $d_9 = 1.2000$ | $n_{d6} = 1.61340$ | $\nu_{d6} = 43.84$ |
| $r_{10} = 5.9340$ | $d_{10} = 6.2000$ | $n_{d7} = 1.43389$ | $\nu_{d7} = 95.15$ |
| $r_{11} = -9.9142$ | $d_{11} = 1.0000$ | $n_{d8} = 1.61340$ | $\nu_{d8} = 43.84$ |

-continued

| | | | |
|---|---|---|---|
| $r_{12} = 11.6139$ | $d_{12} = 12.9532$ | | |
| $r_{13} = 10.6327$ | $d_{13} = 3.0000$ | $n_{d9} = 1.59551$ | $\nu_{d9} = 39.21$ |
| $r_{14} = 13.5256$ | $d_{14} = 1.0000$ | $n_{d10} = 1.51821$ | $\nu_{d10} = 65.04$ |
| $r_{15} = 7.6572$ | | | |

| cover glass thickness (mm) | 0.11 | 0.17 | 0.23 |
|---|---|---|---|
| WD | 1.149 | 1.1 | 1.05 |
| $d_8$ | 0.355 | 0.651 | 0.966 |
| $d_{12}$ | 13.249 | 12.953 | 12.638 |

(1) $|r_1/f| = 0.93$
(2) $|f_2/f| = 5.77$
(3) $|f_3/f| = 67.4$
(4) $\nu_{2P} = 95.15$
(5) $\nu_{2N} = 43.84$
(6) $\nu_{3P} = 39.21$
(7) $\nu_{3N} = 65.04$

Example 5

| | | | |
|---|---|---|---|
| $r_1 = -2.2489$ | $d_1 = 4.8205$ | $n_{d1} = 1.67790$ | $\nu_{d1} = 55.33$ |
| $r_2 = -3.5706$ | $d_2 = 0.1500$ | | |
| $r_3 = 30.5735$ | $d_3 = 1.1000$ | $n_{d2} = 1.67790$ | $\nu_{d2} = 55.33$ |
| $r_4 = 10.0636$ | $d_4 = 4.1900$ | $n_{d3} = 1.43389$ | $\nu_{d3} = 95.15$ |
| $r_5 = -10.3121$ | $d_5 = 0.3000$ | | |
| $r_6 = 20.4415$ | $d_6 = 1.2000$ | $n_{d4} = 1.59551$ | $\nu_{d4} = 39.21$ |
| $r_7 = 11.6859$ | $d_7 = 4.7800$ | $n_{d5} = 1.43389$ | $\nu_{d5} = 95.15$ |
| $r_8 = -10.5877$ | $d_8 = 0.9500$ | | |
| $r_9 = 21.8132$ | $d_9 = 3.5000$ | $n_{d6} = 1.43389$ | $\nu_{d6} = 95.15$ |
| $r_{10} = -11.3027$ | $d_{10} = 1.1000$ | $n_{d7} = 1.61340$ | $\nu_{d7} = 43.84$ |
| $r_{11} = 6.4362$ | $d_{11} = 3.0000$ | $n_{d8} = 1.43389$ | $\nu_{d8} = 95.15$ |
| $r_{12} = 130.8197$ | $d_{12} = 15.9097$ | | |
| $r_{13} = 9.7733$ | $d_{13} = 3.3857$ | $n_{d9} = 1.59551$ | $\nu_{d9} = 39.21$ |
| $r_{14} = -88.6340$ | $d_{14} = 1.2500$ | $n_{d10} = 1.50378$ | $\nu_{d10} = 66.81$ |
| $r_{15} = 7.0879$ | | | |

| cover glass thickness (mm) | 0.11 | 0.17 | 0.23 |
|---|---|---|---|
| WD | 0.446 | 0.4 | 0.354 |
| $d_8$ | 0.417 | 0.95 | 1.503 |
| $d_{12}$ | 16.442 | 15.91 | 15.357 |

(1) $|r_1/f| = 0.5$
(2) $|f_2/f| = 8.9$
(3) $|f_3/f| = 61.7$
(4) $\nu_{2P} = 95.15$
(5) $\nu_{2N} = 43.84$
(6) $\nu_{3P} = 39.21$
(7) $\nu_{3N} = 66.81$

The microscope objective in each of the above-described Examples of the present invention, in which the bundle of rays on the image side is afocal, is used in combination with an imaging lens which has lens data shown below, for example, and which is illustrated in the sectional view of FIG. 6 In the following lens data: $r_1'$, $r_2'$ ... are the curvature radii of lens surfaces, which are shown in order from the object side; $d_1'$, $d_2'$ ... are the spacings between adjacent lens surfaces, shown in order from the object side; $n_{d1}'$, $n_{d2}'$ ... are the refractive indices of the lenses for the spectral d-line, shown in order from the object side; and $\nu_{d1}'$, $\nu_{d2}'$ ... are the Abbe's numbers of the lenses, shown in order from the object side.

| | | | |
|---|---|---|---|
| $r_1' = 68.7541$ | $d_1' = 7.7321$ | $n_{d1}' = 1.48749$ | $\nu_{d1}' = 70.20$ |
| $r_2' = -37.5679$ | $d_2' = 3.4742$ | $n_{d2}' = 1.80610$ | $\nu_{d2}' = 40.95$ |
| $r_3' = -102.8477$ | $d_3' = 0.6973$ | | |
| $r_4' = 84.3099$ | $d_4' = 6.0238$ | $n_{d3}' = 1.83400$ | $\nu_{d3}' = 37.16$ |
| $r_5' = -50.7100$ | $d_5' = 3.0298$ | $n_{d4}' = 1.64450$ | $\nu_{d4}' = 40.82$ |
| $r_6' = 40.6619$ | | | |

Figure 6:
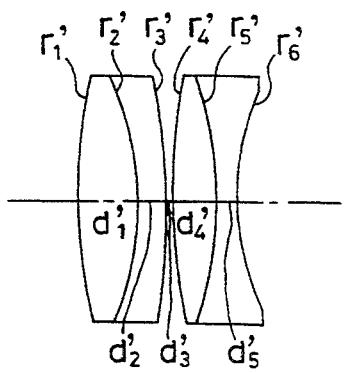
FIG. 6 is a sectional view of one example of an imaging lens used in combination with the microscope objective of the present invention.

FIGS. 7a–c to 11a–c graphically show spherical aberration, astigmatism, coma and distortion at the image field in each of the combinations of the microscope objectives in Examples 1 to 5 and the imaging lens shown in FIG. 6 for each of the cover glass thicknesses: 0.11 mm (a), 0.17 mm (b), and 0.23 mm (c).

As will be clear from the foregoing description, Examples 1, 2, 3 and 5 satisfy the conditions (1) and (2), that is, $|r_1/f| < 1$ for the condition (1), and $|f_2/f| > 7$ for the condition (2). Accordingly, axial chromatic aberration is satisfactorily corrected up to the vicinity of the diffraction limit in the visible region (from the spectral C-line to the spectral g-line).

As has been described above, the present invention provides an apochromatic microscope objective of high numerical aperture which is effectively corrected for various aberrations caused by a change in thickness of a transparent plane-parallel plate, e.g., a cover glass, which is disposed on the object side.

What I claim is:

1. A microscope objective comprising, in order from the object side:
   a 1-st lens unit ($G_1$) of positive refractive power which includes a positive meniscus lens having a concave surface directed toward the object side to convert a bundle of rays from an object into a convergent bundle of rays;
   a 2-nd lens unit ($G_2$) having a negative refractive power; and a 3-rd lens unit ($G_3$) having a small refractive power; said 2-nd lens unit ($G_2$) being movable relative to said 1-st and 3-rd lens units ($G_1$ and $G_3$) along an optical axis in accordance with a change in thickness of a transparent plane-parallel plate disposed between said 1-st lens unit ($G_1$) and the object, and said microscope objective satisfying the following conditions:

$$0.2 < |r_1/f| < 1.5 \tag{1}$$

$$5 < |f_2/f| < 20 \tag{2}$$

$$40 < |f_3/f| \tag{3}$$

where $r_1$ is the curvature radius of a lens surface in said 1-st lens unit ($G_1$) that is the closest to the object side; $f_2$ and $f_3$ are the respective focal lengths of said 2-nd and 3-rd lens units ($G_2$ and $G_3$); and f is the focal length of the entire system.

2. A microscope objective according to claim 1, wherein said 2-nd and 3-rd lens units ($G_2$ and $G_3$) include cemented lenses, respectively, which satisfy the following conditions:

$$\nu_{2P} > 70 \tag{4}$$

$$35 < \nu_{2N} < 50 \tag{5}$$

$$35 < \nu_{3P} < 50 \tag{6}$$

$$\nu_{3N} > 50 \tag{7}$$

where $\nu_{2P}$ and $\nu_{2N}$ are the respective Abbe's numbers of positive and negative lenses constituting the cemented lens included in said 2-nd lens unit ($G_2$), and $\nu_{3P}$ and $\nu_{3N}$ are the respective Abbe's numbers of positive and negative lenses constituting the cemented lens included in said 3-rd lens unit ($G_3$).

3. A microscope objective according to claim 1 or 2, wherein said 1-st lens unit ($G_1$) includes a positive meniscus lens having a concave surface directed toward the object side, and two positive cemented lenses; said 2-nd lens unit ($G_2$) includes a cemented lens composed of three lens elements; and said 3-rd lens unit ($G_3$) includes a meniscus lens having a convex surface directed toward the object side.

4. A microscope objective according to claim 1 or 2, wherein said 1-st lens unit ($G_1$) includes two positive meniscus lenses each having a concave surface directed toward the object side, and a cemented lens composed of three lens elements; said 2-nd lens unit ($G_2$) includes a cemented lens composed of three lens elements; and said 3-rd lens unit ($G_3$) includes a meniscus lens having a convex surface directed toward the object side.

* * * * *